United States Patent
Zheng et al.

(10) Patent No.: US 6,171,688 B1
(45) Date of Patent: Jan. 9, 2001

(54) MATERIAL AND METHOD FOR THE PREPARATION THEREOF

(75) Inventors: James Zheng; Roger J. Morgan; Robert Jurek, all of Midland, MI (US)

(73) Assignee: Board of Trustees operating Michigan State University, East Lansing, MI (US)

(*) Notice: Under 35 U.S.C. 154(b), the term of this patent shall be extended for 0 days.

(21) Appl. No.: 09/246,527

(22) Filed: Feb. 8, 1999

(51) Int. Cl.$^7$ ................. B32B 5/16; B32B 5/18; C08J 9/32

(52) U.S. Cl. ............... 428/313.5; 264/45.3; 264/119; 264/122; 428/313.9; 428/317.9; 428/325; 428/326; 428/327; 523/218; 523/219

(58) Field of Search ............... 428/313.5, 313.9, 428/317.9, 325, 326, 327; 523/218, 219; 264/45.3, 119, 122

(56) References Cited

U.S. PATENT DOCUMENTS

| | | |
|---|---|---|
| 3,900,543 | 8/1975 | Davis . |
| 3,902,937 | 9/1975 | Arndt et al. . |
| 4,144,372 * | 3/1979 | Beck ..................................... 442/104 |
| 4,250,136 | 2/1981 | Rex . |
| 4,403,107 | 9/1983 | Hoffman . |
| 4,447,565 | 5/1984 | Lula et al. . |
| 4,788,230 | 11/1988 | Mudge . |
| 4,919,866 | 4/1990 | Kubbutat . |
| 5,132,061 | 7/1992 | Lindeman et al. . |
| 5,242,637 | 9/1993 | Inoue et al. . |
| 5,492,756 | 2/1996 | Seale et al. . |
| 5,585,054 | 12/1996 | Evans . |
| 5,587,231 * | 12/1996 | Meteer et al. ........................ 442/375 |

* cited by examiner

Primary Examiner—Blaine Copenheaver
(74) Attorney, Agent, or Firm—Ian C. McLeod

(57) ABSTRACT

Composite products incorporating a polymer matrix, polymer microspheres, glass microspheres and natural fibers, particularly kenaf and wood fibers, are described. The polymer microspheres are 15 to 50 microns in diameter and are smaller than the glass microspheres which are 50 to 200 microns in diameter. The polymer microspheres reduce voids and prevent cracking of the glass microspheres upon compression. The composites have low cost and high strength.

14 Claims, 2 Drawing Sheets

MATERIAL AND METHOD FOR THE PREPARATION THEREOF

BACKGROUND OF THE INVENTION

(1) Summary of the Invention

The present invention relates to novel composite materials and methods for the preparation thereof. In particular the present invention relates to composite material prepared by a method which uses combinations of relatively large glass microspheres and relatively small polymer microspheres admixed with a solid polymer, wood flour (particles) and natural fibers to provide composite materials having unique physical properties.

(2) Description of Related Art

Syntactic foam materials are mixtures of polymers and hollow microspheres. The resulting composite materials are lighter in weight than the solid polymer.

The patent art is shown by U.S. Pat. No. 3,900,543 to Davis; U.S. Pat. No. 3,902,937 to Arndt et al; U.S. Pat. No. 4,250,136 to Rex; U.S. Pat. No. 4,403,107 to Hoffman; U.S. Pat. No. 4,788,230 to Mudge; U.S. Pat. No. 4,447,565 to Lula et al; U.S. Pat. No. 5,242,637 to Inoue et al; U.S. Pat. No. 4,919,866 to Kubbutat; U.S. Pat. No. 5,132,061 to Lindeman et al; U.S. Pat. No. 5,492,756 to Seale et al; and U.S. Pat. No. 5,585,054 to Evans.

Davis et al describe buoyant foams using glass or plastic beads. Arndt et al describe a foam containing glass microspheres. Rex describes composite materials made of microspheres (10 to 200 microns) and macrospheres (500 to 15,000 microns) with a polymer as a foam core. Hoffman describes a polymer material containing hollow glass microspheres. Mudge describes syntactic foams prepared by mixing a polymer and microspheres. Lula et al describe microspheres used with a molecular sieve for water absorption. Inoue et al describe composite products with a syntactic foam core. Kubbutat describes a foam containing glass microspheres and an epoxy resin and glass fibers. Lindeman et al describe gaskets made of polymer microspheres. The microspheres are expanded in the formation of the gasket.

The use of kenaf fibers in composite materials is described in U.S. Pat. No. 5,585,054 to Evans and U.S. Pat. No. 5,492,756 to Seale et al. These patents do not describe the use of microspheres.

The problem the prior art is faced with is to provide very low cost, higher strength composite materials using microspheres and various natural fibers, particularly kenaf fibers.

OBJECTS

It is therefore an object of the present invention to provide novel composite products and methods for preparing them using wood flour natural fibers and microspheres which have superior strengths. Further, it is an object of the present invention to provide composite products which are economical and easy to prepare. These and other objects will become increasingly apparent by reference to the following description and the drawings.

DESCRIPTION OF PREFERRED EMBODIMENTS

Figure 1:
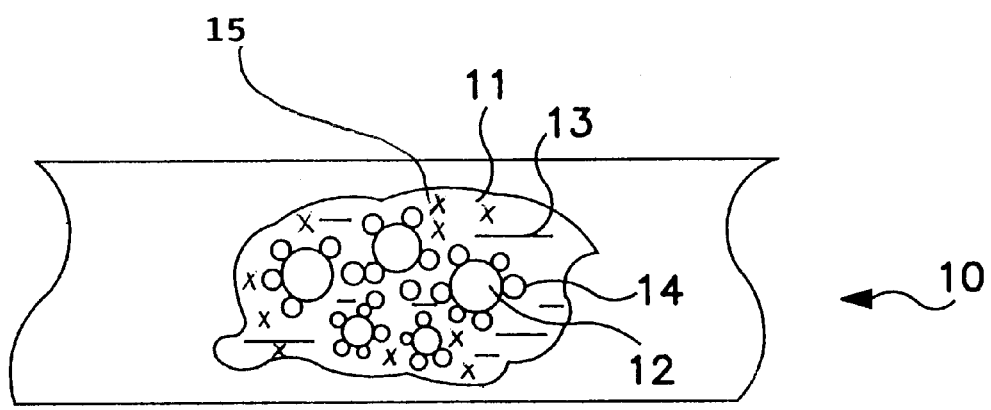
FIG. 1 is a schematic front cross-sectional magnified view of the composite material 10 of the present invention.

The present invention relates to a composite material which comprises in admixture: wood flour having a particle size between about 150 and 250 microns; dried natural fibers having a width in a narrow dimension of between 40 and 60 microns and a length between about 0.6 and 2.5 cm; hollow first microspheres of a polymer having a diameter between about 15 and 50 microns; hollow second microspheres of glass having a diameter between about 50 and 200 microns which are larger than the polymer microspheres; and a cured polymer matrix, wherein the weight ratio of wood flour and fibers to first and second microspheres is between about 1 to 10 and 10 to 1.

Further, the present invention relates a method for preparing a composite material which comprises: mixing hollow first microspheres of a polymer having a diameter between about 15 and 50 microns with a liquid polymer to provide a first mixture; mixing hollow second microspheres of glass having a diameter between about 50 and 100 microns and larger than the first microspheres into the first mixture of step (a) to produce a second mixture; mixing wood flour having a particle size between about 50 and 400 microns into the second mixture to produce a third mixture; mixing natural fibers having a narrow dimension of 40 to 60 microns and lengths between about 0.6 and 2.5 cm into the third mixture to provide a fourth mixture; and introducing the fourth mixture in a mold so as to produce the composite material.

The materials of the present invention are preferably compression molded preferably between 35 and 500 psi. Increasing pressure provides increasing density.

The development of the preferred composite material of the present invention involved material survey and selection, material processibility, performance and aesthetics as follows:

1. Material survey and selection:
   Survey: Polymer thermoplastic or thermoset capable of forming stiff, strong, foamed homogeneous compression moldable sheets.
   Selection decision: based on potential cost/performance/processibility.
2. Processibility:
   Compression molding of foam sheets and board.
3. Performance Evaluation:
   Flexural modulus and strength of developed material will be measured as initial performance evaluation. The material is tested following NEMA (National Electrical Manufacturers Association) standards.
4. Aesthetics:
   Fillers, additives
   Colors (combination of different colors for polymer and fillers).

An "Integral Foam" is a foam with a cellular core structure and a relatively smooth (harder) skin. The structure of an integral foam gives it high rigidity and bending/shear strengths. Wood is 5 to 10 times stiffer than integral foam. In all other respects, integral foam equals or exceeds wood's performance. It does not rot or absorb water nor is it a source of nourishment for insects. Large surface areas will not warp, split or splinter. Integral foams have the appearance, feel, weight and sound of wood.

Integral foam parts can be fastened using the same methods as with wood. Screws, staples, and nails have approximately the same retention properties as in wood. Joining elements such as tongues, grooves dovetails, as well as mortice and tenon can be molded into the mating parts, saving assembly operations and providing excellent joint strength.

Integral foam can be made to look very much like wood with color and graining molded in, and the surface can be finished with stains, waxes, varnish, and the like. Unlike wood, an integral foam does not possess a porous surface and so it resists discoloration.

The properties of integral foams change widely as a function of the method of manufacture, secondary treatment techniques, composition, density, dimension and shape etc. Among these factors, density is the most important parameter which determines the mechanical properties of the integral foam. A recent study shows that the tensile strength of polycarbonate foams is proportional to the foam density. It was also found that the relative tensile modulus of the foam increases as the square of the foam's relative density. However, these simple relationships between flexural strength or modulus and density of the foams are not universal for all polymer foams.

The composite products of the present invention are syntactic foams. As previously discussed, a "syntactic foam" is made using a resin matrix to which has been added hollow spheres of various materials. The resulting product is a closed cell foam-like material which is made without the use of a blowing agent. The most common matrix resins are epoxies and polyesters, although urethanes, PVC plastisols, and phenolic resins have also been used. Indeed, any polymer which can be made liquid, either before final polymerization or by heat, can be used as the binding matrix.

Syntactic foams are made by simply mixing the microspheres into the catalyzed resin until the desired consistency is obtained. In most cases the materials are mixed to a puttylike state or, if a casting material is described, to a state in which the material can just be cast. The preferred ratio of filler to resin is approximately 60% filler by volume.

A syntactic foam provides a weight reduction with better resultant physical properties than if the polymer had been formed by chemical or physical means to the same specific gravity. The synthetic wood product made from resins and hollow spheres has the feel, look, and texture of real wood. Generally, the property improvements gained from using hollow glass beads are: water resistance, compressive strength, shrinkage and impact strength. Other significant advantages derived from utilizing hollow spheres are: low density; chemical stability and inertness; and crack arresting characteristics, which results in easy machining, sanding, nailing, and finishing.

In the present invention, the glass microspheres are larger than the polymer microspheres. The polymer microspheres fill in the interstices between the glass microspheres so that discontinuities in the composite material are reduced or eliminated and the strengths are increased. Further, the small polymer microspheres cushion the glass microspheres to prevent them from breaking. FIG. 1 is a sketch showing the composite material 10 which uses the polymer 11 as a matrix containing the relatively large glass microspheres 12, the fibers 13 and the relatively small polymer microspheres 14. The wood particles 15 are shown by "X". The preferred ratio of the diameters of the glass microspheres to polymer microspheres is between about 5 to 1 and 2 to 1. The glass microspheres are between about 50 and 200 microns in diameter. The polymer microspheres are between about 15 and 50 microns.

The fibers used in the present invention are dried natural fibers with hair-like projections from a main body of the fiber. Kenaf fibers are preferred, particularly kenaf fibers which have been screened or sorted to the required dimensions. Other fibers include wood plant fibers of various species, particularly those where the fibers have the hairy projections along their length. Such fibers are well known to those skilled in the art. The fibers have a width or a narrow dimension of between 40 and 60 microns and lengths between about 0.6 and 2.5 cm.

The wood flour has a particle size between 50 and 400 microns. It is readily obtainable and inexpensive.

The glass microspheres can be made of recycled glass. The polymer microspheres can be composed of any polymer which does not dissolve during the formation of the composite material. With the preferred polyester resins of the present invention, the polymer microspheres are composed of a copolymer of vinylidene chloride and acrylonitrile. Cost is also a significant factor in the preferred polymer microspheres. Recycled polymers can be used as a source for producing the microspheres. The matrix polymers can be selected from:

| | |
|---|---|
| Acrylonitrile-butadiene-styrene copolymer | (ABS) |
| Polytetrafluoroethylene | (PTFE) |
| Polycarbonate | (PC) |
| Phenolic | (Ph) |
| High-density polyethylene | (HDPE) |
| Low-density polyethylene | (LDPE) |
| Low-low-density polyethylene | (LLDE) |
| Polypropylene | (PP) |
| Polyurethane | (PUR) |
| Polyethylene terephthalate | (PET) |
| Poly-(butylene terephthalate) | (PBT) |
| Poly(vinyl chloride) | (PVC) |
| Polyetheretherketone | (PEEK) |
| Poly(phenylene oxide) | (PPO) |
| Polyetherimide | (PEI) |
| Polyphenylene sulfide | (PPS) |
| Vinyl Esters | (VE) |

Most preferred are polyester polymers; particularly STYPOL® 40-3951 (Cook Composites and Polymers Co., Kansas City, Mo.) which is a general purpose molding resin particularly where metal dies are used. This polymer produces a high gloss finish and very good physical properties. It is catalyzed by benzoyl peroxide (Cadox E paste), 40% emulsion (Cook Composites). The polymers can be thermoset or thermoplastic. Preferably the polymers are thermoset with a curing agent in a compression mold. The thermoset polymers are liquid for molding.

An advantage of the present invention is that complex shapes can be easily produced since the wood flour fibers are discontinuous and can conform to the mold. A further advantage is that voids are avoided. The molds can be metal or any material which allows the molding. Metal molds are preferred for compression molding. The compression can be up to the point where the glass microspheres collapse, which in the preferred composite materials described herewith is between about 35 and 250 psi (0.241 to 1.73 MPa), which is about the crushing point of the glass sphere. Up to 500 psi (3.45 MPa) can be used with some glass spheres.

Figure 2:
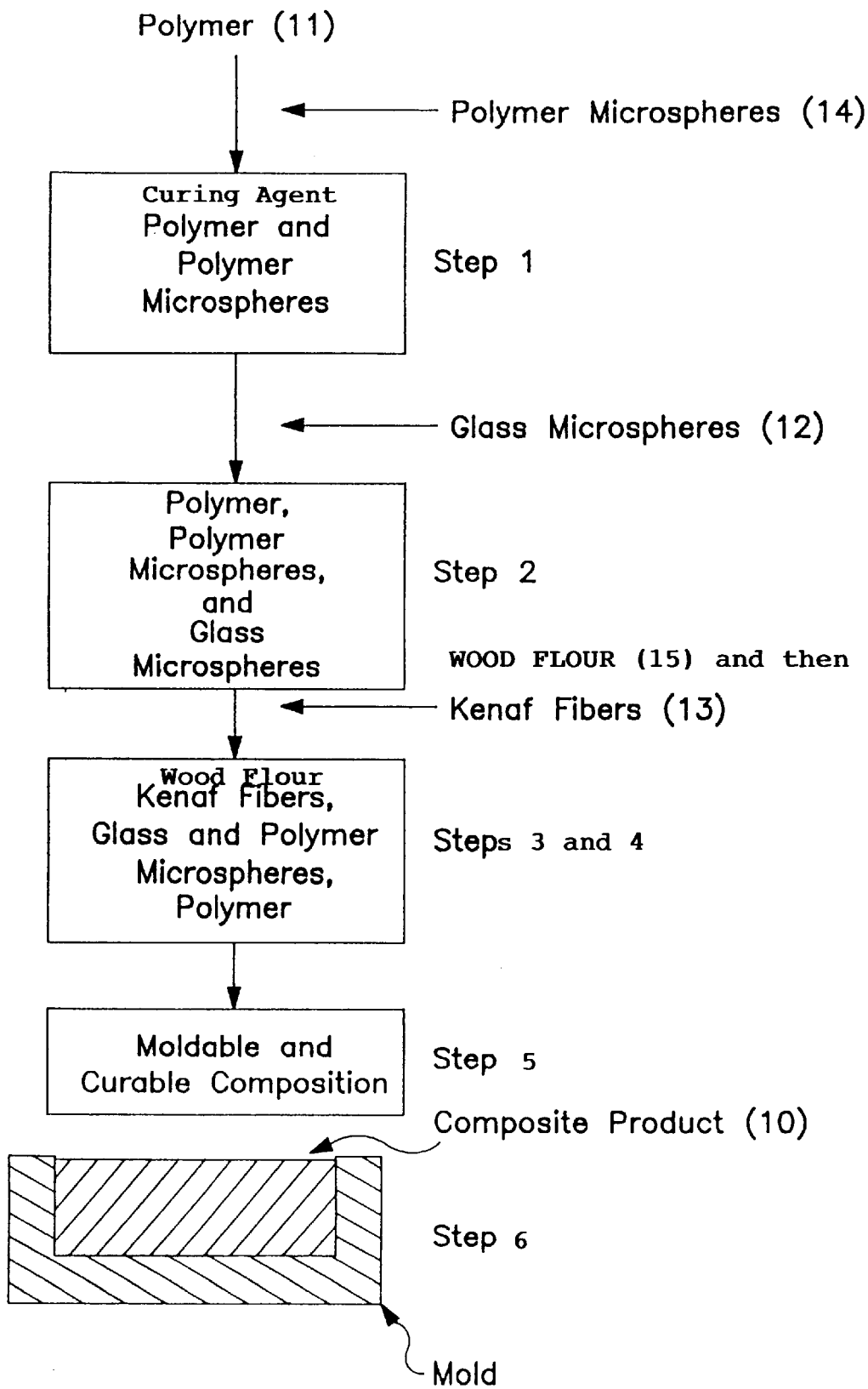
FIG. 2 is a schematic view showing the steps in the preferred method of the present invention.

In the method of the present invention the order of addition of the ingredients is important as shown in FIG. 2. The polymer microspheres are mixed with the liquid resin first (step 1) in order to provide uniform dispersion. Then the glass microspheres are added to the mixture so that the polymer microspheres surround the glass microspheres (step 2). The wood flour is then added (step 3). The natural fibers are then blended into the mixture (step 4). The curing agent if any, can be added at any point (preferably in the beginning) so long as the mixture remains sufficiently fluid for molding (steps 5 and 6).

Glass microspheres:
   (1) K-1 from 3M. (Minneapolis, Minn.)
       Size: 20 $\mu$m to 90 $\mu$m, Average particle density: 0.125 g/cc (7.8 pcf)
Strength—Collapse: 250 psi (1.73 MPa), 10%
(2) ECCOSPHERE EP from Emerson & Cuming, Inc. Canton, Mass.
Size: 40 to 150 μm
Average particle density: 0.25 g/cc (15.6 pcf)
Strength—% Collapse: 500 psi (3.45 MPa), 14%

Polymer Microspheres:
EXPANCEL 551, Expancal ICN, Duluth, Ga.
Kenaf Fibers: Mississippi State University
Wood Flour: American Wood Fibers, Schofield, Wis.

Polymer polyester resin and 1 wt % catalyst benzoyl peroxide were well mixed in a plastic beaker at room temperature first. The mixture then was degassed in a vacuum oven for 10 minutes at 50° C. After degas, weighted hollow spheres were added to the mixture and well mixed with polyester resin. For up to 40 vol % microspheres contents, liquid molding method (no pressure was applied during casting) was employed because the viscosity was low for these samples. However, for 60% (volume percent) and higher microspheres content samples, compression molding was performed using a Tetrahedron press with the following processing conditions:

The preferred heating is from room temperature to 220° F. The heating rate was 10° F./minute; dwell one hour, the compression force was set at 2,000 lb. (746 kg) (minimum setting of the equipment) for 6"×2" (15.2×5 cm) mold and 3,000 to 11,000 lb. (4,103 kg) for 8"×8" (20.3×20.3 cm) mold.

EXAMPLE 1

A total of 12 prototype boards were fabricated. The boards with various densities were made using different formulations. Table 1 shows the formulations used for tests.

TABLE 1

Formulations used to make board:

weight parts

| | Polyester | glass bubble | kenaf fiber | wood flour | plastic bubble | density lb/cf | note |
|---|---|---|---|---|---|---|---|
| 1 | 100 | 45 | 40 | 0 | 0 | 35.7 | x2 * |
| 2 | 100 | 35 | 30 | 0 | 0 | 40.0 | * |
| 3 | 100 | 30 | 0 | 30 | 0 | 37.2 | x2 |
| 4 | 100 | 25 | 0 | 30 | 0 | 50.0 | x2 |
| 5 | 100 | 20 | 0 | 25 | 0 | 39.0 | x2 |
| 6 | 100 | 30 | 0 | 30 | 0 | 39.8 | |
| 7 | 100 | 30 | 15 | 15 | 0 | 44.9 | * |
| 8 | 100 | 35 | 15 | 15 | 0 | 47.8 | x2 * |
| 9 | 100 | 15 | 15 | 15 | 10.5 | 38.0 | x2 * |
| 10 | 100 | 15 | 15 | 15 | 10.5 | 36.5 | 3 klb press |
| 11 | 100 | 15 | 15 | 15 | 10.5 | 38.4 | mech. tests |
| 12 | 100 | 15 | 15 | 15 | 10.5 | 38.7 | x2, repeat |

Processing

Polyester resin and 1 wt % catalyst benzoyl peroxide were well mixed in a plastic beaker at room temperature first. The weighted plastic bubbles were added to the mixture and well mixed with polyester resin. Then, weighted glass bubbles were added into the mixture and well mixed. Wood flour then was added and mixed. Last, kenaf fibers were mixed into the mixture. Compression molding was performed using a Tetrahedron press with following processing conditions:

Room Temperature to 220° F. at a heating rate 10° F./minute with a dwell at 220 OF for one hour. The compression force was set at 3000 lb. for 8"×8" mold (46.9 psi).

Material Testing

Five samples were tested by a third party as indicated in Table 1 (* in the note column). The formulations of the boards have been adjusted according to the feedback from the testing results. Sample #9 through #12 were the best samples.

Mechanical Properties

The mechanical properties have been tested using the #9 formulation. The average (5 specimens) flexural modulus is 315,000 PSI and flexural strength is about 1,800 PSI.

Moisture Absorption

The moisture absorption tests show that the #9 sample only absorb 0.1% water after 15 days at 250C, 50% RH. At 35° C. and 90% RH, the material absorb about 1.4% moisture after 27 days.

Dimensional Stability

The dimensional change was non-detectable at following conditions:

Temperature from 25 to 60° C., RH from 50 to 90%. In other words, the dimensional change for this material (8"× 8"×⅝" size board) from 25° C. to 60° C., and RH 50 to 90%, is less than ¹⁄₁₀₀ cm (100 μm).

It is intended that the foregoing description be only descriptive of the present invention and be limited only by the hereinafter appended claims.

We claim:

1. A composite material which comprises in admixture:
   (a) wood flour having a particle size between about 50 and 400 microns;
   (b) dried natural fibers having a width in a narrow dimension of between 40 and 60 microns and a length between about 0.6 and 2.5 cm;
   (c) hollow first microspheres of a polymer having a diameter between about 15 and 50 microns;
   (d) hollow second microspheres of glass having a diameter between about 50 and 200 microns which are larger than the polymer microspheres; and
   (e) a cured polymer matrix, wherein the weight ratio of wood flour and fibers to first and second microspheres is between about 10 to 1 and 1 to 10.

2. The composite of claim 1 wherein the first microspheres are essentially insoluble in a liquid polymer which forms the cured polymer.

3. The composite of any one of claim 1 or 2 wherein the cured polymer is a cured polyester polymer.

4. The composite material of claim 1 wherein the first microspheres are composed of a copolymer of vinylidene chloride and acrylonitrile.

5. The composite material of any one of claim 1 or 2 which has been compression molded.

6. The composite material of claim 1 wherein the first microspheres are composed of a copolymer of vinylidene chloride and acrylonitrile, the cured polymer is a polyester polymer and the natural fiber is kenaf fiber.

7. The composite material of claim 6 which has been compression molded.

8. A method for preparing a composite material which comprises:
   (a) mixing hollow first microspheres of a polymer having a diameter between about 15 and 50 microns with a curable liquid polymer to provide a first mixture;
   (b) mixing hollow second microspheres of glass having a diameter between about 50 and 100 microns and larger than the first microspheres into the first mixture of step (a) to produce a second mixture;

(c) mixing natural fibers having a narrow dimension of 40 to 60 microns and lengths between about 0.6 and 2.5 cm into the second mixture to provide a third mixture;

(d) mixing wood flour having a particle size between about 50 and 400 microns into the third mixture; and (e) introducing the fourth mixture in a mold so as to produce the composite material.

9. The method of claim 8 wherein the first microspheres are essentially insoluble in the liquid polymer during the curing.

10. The method of any one of claim 8 or 9 wherein the liquid polymer is a polyester polymer which is admixed with a curing agent.

11. The method of claim 8 wherein the first microspheres are composed of a copolymer of vinylidene chloride and acrylonitrile.

12. The method of claim 8 wherein the first microspheres are composed of a copolymer of vinylidene chloride and acrylonitrile, the liquid polymer is a polyester polymer, and the natural fibers are kenaf fibers.

13. The method of any one of claim 8, 10, 11 or 12 wherein the composite material is compressed in the mold.

14. The method of claim 8 wherein the compression molding is at a pressure of between about 35 and 500 psi.

* * * * *

UNITED STATES PATENT AND TRADEMARK OFFICE
CERTIFICATE OF CORRECTION

PATENT NO.    : 6,171,688 B1
DATED         : January 9, 2001
INVENTOR(S)   : James Zheng, Roger J. Morgan and Robert Jurek Page 1 of 1

It is certified that error appears in the above-identified patent and that said Letters Patent is hereby corrected as shown below:

Column 5,
Line 2, before "Collapse" insert -- % --.
Line 38, "board" should be -- boards --.

Column 6,
Line 2, "at 220 OF" should be -- 220°F --.
Line 16, "250C" should be -- 25°C --.

Column 8,
Line 10 (Claim 13), "of Claim 8, 10, 11 or 12" should be -- of Claims 8, 9, 11 or 12 --.

Signed and Sealed this

Twenty-third Day of October, 2001

Attest:

*Attesting Officer*

NICHOLAS P. GODICI
*Acting Director of the United States Patent and Trademark Office*